(12) United States Patent
Majumdar et al.

(10) Patent No.: US 11,263,377 B1
(45) Date of Patent: Mar. 1, 2022

(54) CIRCUIT ARCHITECTURE FOR EXPANDED DESIGN FOR TESTABILITY FUNCTIONALITY

(71) Applicant: Xilinx, Inc., San Jose, CA (US)

(72) Inventors: Amitava Majumdar, San Jose, CA (US); Albert Shih-Huai Lin, Mountain View, CA (US); Partho Tapan Chaudhuri, Nagpur (IN); Niravkumar Patel, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/219,174

(22) Filed: Mar. 31, 2021

(51) Int. Cl.
| | |
|---|---|
| *G06F 30/333* | (2020.01) |
| *G06F 30/3308* | (2020.01) |
| *G06F 30/398* | (2020.01) |
| *G06F 11/00* | (2006.01) |
| *G01R 31/28* | (2006.01) |
| *H01L 25/00* | (2006.01) |
| *H03K 19/00* | (2006.01) |
| *G06F 115/08* | (2020.01) |
| *G06F 11/08* | (2006.01) |

(52) U.S. Cl.
CPC ............ *G06F 30/333* (2020.01); *G01R 31/28* (2013.01); *G06F 11/08* (2013.01); *G06F 30/3308* (2020.01); *G06F 30/398* (2020.01); *G06F 2115/08* (2020.01); *H01L 25/00* (2013.01); *H03K 19/00* (2013.01)

(58) Field of Classification Search
CPC .. G06F 30/333; G06F 30/3308; G06F 30/398; G06F 11/08; G06F 2115/08; H01L 25/00; H03K 19/00; G01R 31/28

USPC ....... 716/136, 111; 703/16; 326/16, 47, 101; 714/32, 732, 734, 742
See application file for complete search history.

(56) References Cited

U.S. PATENT DOCUMENTS

| | | |
|---|---|---|
| 5,673,273 A | 9/1997 | Almy |
| 6,389,558 B1 | 5/2002 | Herrmann |
| 6,944,836 B1 | 9/2005 | Lai |
| 7,337,438 B1 * | 2/2008 | Dobbins ................ G06F 8/425 717/141 |
| 7,739,564 B1 | 6/2010 | Lai |
| 8,063,654 B2 | 11/2011 | Rahman et al. |
| 8,072,234 B2 | 12/2011 | Fox |
| 8,327,201 B1 | 12/2012 | Lai |
| 9,685,957 B2 | 6/2017 | How |
| 10,816,598 B1 | 10/2020 | Xilinx |

(Continued)

*Primary Examiner* — Phallaka Kik
(74) *Attorney, Agent, or Firm* — Kevin T. Cuenot

(57) ABSTRACT

A circuit architecture for expanded design for testability functionality is provided that includes an Intellectual Property (IP) core for use with a design for an integrated circuit (IC). The IP core provides an infrastructure harness circuit configured to control expanded design for testability functions available within the IC. An instance of the IP core can be included in a circuit block of the design for the IC. The infrastructure harness circuit can include an outward facing interface configured to connect to circuitry outside of the circuit block and an inward facing interface configured to connect to circuitry within the circuit block. The instance of the IP core can be parameterized to configure the infrastructure harness circuit to control a plurality of functions selected from the expanded design for testability functions based on a user parameterization of the instance of the IP core.

20 Claims, 11 Drawing Sheets

---

1100

Provide an Intellectual Property core for use with a design for an integrated circuit, wherein the Intellectual Property core provides an infrastructure harness circuit configured to control expanded design for testability functions available in the integrated circuit
1102

↓

Include instance of Intellectual Property core in a circuit block of the design for the integrated circuit, wherein the infrastructure harness circuit includes an outward facing interface configured to connect to circuitry outside of the circuit block and in inward facing interface to connect to circuitry within the circuit block
1104

↓

Parameterize the instance of the Intellectual Property core to configure the infrastructure harness circuit to control a plurality of functions selected from the expanded design for testability functions based on a user parameterization of the instance of the Intellectual Property core
1106

(56) References Cited

U.S. PATENT DOCUMENTS

| | | |
|---|---|---|
| 2002/0078412 A1 | 6/2002 | Wang et al. |
| 2005/0154552 A1 | 7/2005 | Stroud et al. |
| 2010/0332909 A1* | 12/2010 | Larson ................ G06F 11/3495 714/40 |
| 2012/0126846 A1 | 5/2012 | Jong et al. |

* cited by examiner

1100

Provide an Intellectual Property core for use with a design for an integrated circuit, wherein the Intellectual Property core provides an infrastructure harness circuit configured to control expanded design for testability functions available in the integrated circuit
1102

Include instance of Intellectual Property core in a circuit block of the design for the integrated circuit, wherein the infrastructure harness circuit includes an outward facing interface configured to connect to circuitry outside of the circuit block and in inward facing interface to connect to circuitry within the circuit block
1104

Parameterize the instance of the Intellectual Property core to configure the infrastructure harness circuit to control a plurality of functions selected from the expanded design for testability functions based on a user parameterization of the instance of the Intellectual Property core
1106

FIG. 11

CIRCUIT ARCHITECTURE FOR EXPANDED DESIGN FOR TESTABILITY FUNCTIONALITY

TECHNICAL FIELD

This disclosure relates to integrated circuits (ICs) and, more particularly, to design methodologies and circuit architectures that provide expanded design for testability functionality.

BACKGROUND

Design for testability (DFT) refers to the practice of including, within an electronic system such as an integrated circuit, circuitry that supports testability functions. DFT functions provide integrated circuit designers the ability to control the state of particular internal nodes of the integrated circuit and to observe the operation of certain circuits within the integrated circuit. DFT techniques support validation of the integrated circuit design through functional testing of the integrated circuit and through manufacturing tests. Scan chains are an example of a DFT technique routinely used in integrated circuit design and manufacture.

SUMMARY

In one aspect, a computer-implemented method includes providing an Intellectual Property (IP) core for use with a design for an integrated circuit (IC). The IP core can provide an infrastructure harness circuit configured to control expanded design for testability functions available within the IC. An instance of the IP core can be included in a circuit block of the design for the IC. The infrastructure harness circuit can include an outward facing interface configured to connect to circuitry outside of the circuit block and an inward facing interface configured to connect to circuitry within the circuit block. The method can include parameterizing the instance of the IP core to configure the infrastructure harness circuit to control a plurality of functions selected from the expanded design for testability functions based on a user parameterization of the instance of the IP core.

In another aspect, a system includes a processor configured to initiate operations. The operations can include providing an IP core for use with a design for an IC. The IP core can provide an infrastructure harness circuit configured to control expanded design for testability functions available within the IC. An instance of the IP core can be included in a circuit block of the design for the IC. The infrastructure harness circuit can include an outward facing interface configured to connect to circuitry outside of the circuit block and an inward facing interface configured to connect to circuitry within the circuit block. The operations can include parameterizing the instance of the IP core to configure the infrastructure harness circuit to control a plurality of functions selected from the expanded design for testability functions based on a user parameterization of the instance of the IP core.

An apparatus can include an IC. The IC can include a plurality of testability circuits. Each testability circuit can correspond to an instance of an IP core. Each instance is independently parameterizable to perform a plurality of functions selected from a set of expanded design for testability functions. Each testability circuit can provide a standardized interface for accessing the plurality of functions selected from the expanded design for testability functions. Each testability circuit includes a controller including one or more circuit blocks corresponding to the plurality of functions selected from the expanded design for testability functions based on a user parameterization for the instance of the IP core that corresponds to the testability circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 11 illustrates an example method of creating a circuit architecture for expanded design for testability functionality.

DETAILED DESCRIPTION

Figure 1:
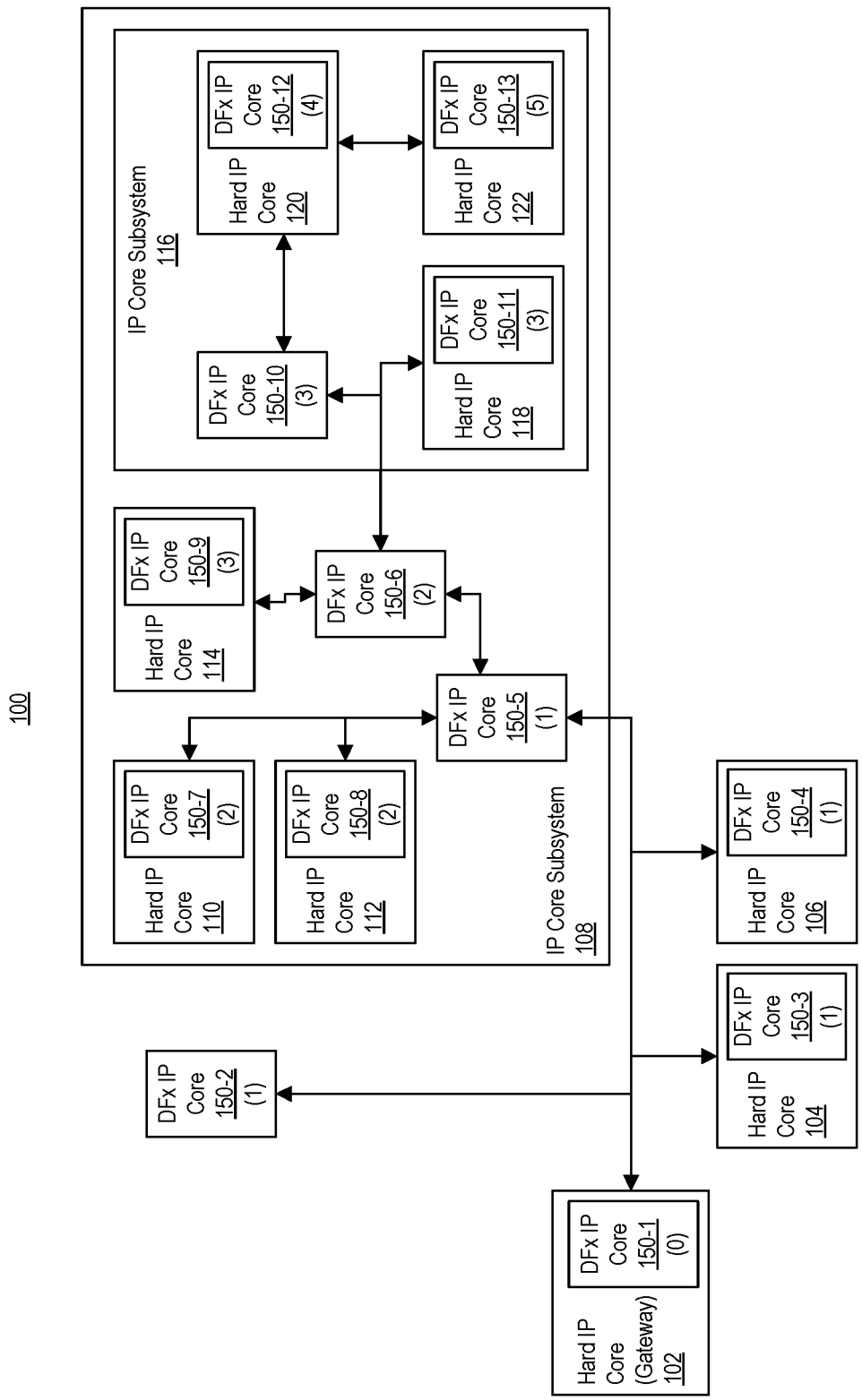
FIG. 1 illustrates an example of a logical view of an integrated circuit.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to design methodologies and circuit architectures that provide expanded design for testability functionality. The inventive arrangements described within this disclosure provide a circuit architecture that supports an expanded set of design for testability (DFT) functions. As defined within this disclosure, the term "expanded design for testability functions" and/or "expanded design for testability functionality" mean design for testability and design for one or more of debugging, initialization, yield, and/or characterization functions. Within this disclosure, expanded design for testability functions and/or functionality may be referred to as "DFx."

In one or more example implementations, a DFx architecture may be realized using an Intellectual Property (IP) core that supports selected DFx functions. The IP core, referred to herein as a "DFx IP core," implements a scalable, plug-and-play circuit architecture that may be incorporated into design and implementation methodologies for various types of subsystems. The DFx IP core may be incorporated into any of a variety of subsystems, whether created by an IC manufacturer and/or designer or created by a $3^{rd}$ party. The DFx IP core may be integrated at one or more levels of hierarchy of a design for an IC.

When instantiated into a design for an IC, each instance of the DFx IP core is capable of providing a standardized interface. The standardized interface may be implemented using columnar and row-wise routing of control wires and data wires. The DFx IP core may include provisions, e.g., constraints (e.g., physical location and/or timing), that are applicable to forward signal paths and/or return signal paths to satisfy timing requirements within the design for the IC. The wires of the standardized interface implemented by the DFx IP core, when incorporated into an IC, may be connected to higher levels of IC assembly through tiling and/or abutment.

The DFx circuit architecture described herein is capable of supporting rapid growth in a circuit design. For example, as new and/or different IP cores (e.g., hardened IP cores) are incorporated into a given design for an IC, an instance of the DFx IP core may be incorporated into such IP cores to achieve scalability of the DFx functions throughout the IC. Each instance of the DFx IP core may be independently parameterized to suit the needs of the IP core and/or subsystem in which the instance is included.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an IC 100. IC 100 may be implemented as, or represent, any of a variety of different ICs. The ICs may or may not be programmable. Examples of IC 100 may include, but are not limited to, a System-on-Chip (SoC), an Application Specific IC (ASIC), a programmable IC such as a Field Programmable Gate Array (FPGA), or a heterogeneous IC having a plurality of different types of subsystems.

FIG. 1 illustrates an example of how a DFx IP core may be incorporated into a design for an IC at one or more different levels of hierarchy to provide a scalable DFx architecture. In the example of FIG. 1, a variety of subsystems are distributed throughout IC 100. The subsystems of IC 100 are organized in a hierarchy having a plurality of different levels. Within this disclosure, the term "subsystem" refers to circuitry that implements a portion of IC 100. A subsystem may be specified as an IP core and/or a hard "IP core" as described below. From time-to-time, IP cores and/or subsystems may also be referred to as "circuit blocks."

As defined herein, the term "Intellectual Property core" or "IP core" means a pre-designed and reusable unit of logic, cell, or chip layout design in the field of electronic circuit design. An IP core may be expressed as a data structure specifying a description of circuitry that performs a particular function. An IP core may be expressed using hardware description language file(s), as a netlist, as a bitstream that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," for an instance of an IC to activate or change certain functionality of the instance of the IP core.

As defined within this disclosure, the term "hard IP core" refers to an IP core that specifies circuitry that is to be implemented in an IC as hardwired circuitry. Circuitry that is "hardwired" or "hardened," as distinguished from "programmable circuitry" (which may include programmable logic), is manufactured as part of the IC. Unlike programmable circuitry, hardwired circuitry is not implemented after the manufacture of the IC through the loading of configuration data. Hardwired circuitry is generally considered to have dedicated circuit elements and/or blocks and dedicated interconnects.

In some instances, hardwired circuitry may have one or more operational modes that can be set or selected according to register settings or values stored in one or more memory elements within the IC. In some cases, the operational modes may be set, for example, through the loading of configuration data into the IC. Despite this ability, hardwired circuitry is not considered programmable circuitry as the hardwired circuitry is operable and has a particular function when manufactured as part of the IC.

In the example of FIG. 1, IC 100 includes hard IP cores 102, 104, and 106; and DFx IP core 150-2. Each of hard IP cores 102, 104, and 106 includes a DFx IP core 150-1, 150-3, and 150-4, respectively. IC 100 further includes an IP core subsystem 108. IP core subsystem 108 includes hard IP cores 110, 112, and 114; DFx IP cores 150-5 and 150-6; and an IP core subsystem 116. Each of hard IP cores 110, 112, and 114 includes a DFx IP core 150-7, 150-8, and 150-9, respectively. IP core subsystem 116 includes a DFx IP core 150-10 and hard IP cores 118, 120, and 122. Each of hard IP cores 118, 120, and 122 includes a DFx IP core 150-11, 150-12, and 150-13, respectively.

In the example of FIG. 1, hard IP core 102 may be implemented as a gateway that is capable of communicating with one or more other systems or circuits external to IC 100. In the example of FIG. 1, hard IP core gateway 102 is used only for testing. For other functions such as debugging, repair, initialization, and/or yield, hard IP core gateway 102 is not needed.

A hierarchy level is assigned to each DFx IP core illustrated in FIG. 1 where the hierarchy level is shown in parenthesis. For example, DFx IP core 150-1 is assigned the highest level in the hierarchy specified as level 0. The next level of hierarchy down is level 1, which includes DFx IP cores 150-2, 150-3, and 150-4. Within this disclosure, the circuit implementations created from instances of a DFx IP core may be referred to as testability circuits (e.g., where each instance of a DFx IP core implements a testability circuit).

In the example of FIG. 1, different levels of DFx functionality may be accessed (e.g., activated and/or deactivated) by selectively enabling different levels of the hierarchy shown. For example, DFx IP core 150-1 may be used to selectively enable individual DFx IP cores 150-2, 150-3, 150-4, and/or 150-5 of level 1. Different ones of the DFx IP cores of level 1 may be used to selectively enable different ones of the DFx IP cores 150-6, 150-7, and/or 150-8 of level 2, and so forth down the hierarchy.

Each of the DFx IP cores illustrated in FIG. 1 may include control logic that maybe used to control and gather status information on different functionality relating to testability, debugging, initialization, yield, and/or characterization. For example, testability may include functions such as scan based logic testing and memory testing. Debugging may include processes and/or functions for silicon debugging such as clock stop and scan dump and memory dump. Initialization may include functions such as scan clear and memory clear. For example, Memory Built-In Self-Test (MBIST) may be used to test memories within an IC during processes such as wafer sort and/or post packaging testing. MBIST circuitry also may be used during normal operation of the IC for purposes of initializing the same memory circuits. Initialization using MBIST circuitry may be used during power up of the IC, for example. Yield may include functions such as memory repair. Characterization refers to "process characterization" where an IC is tested to determine electrical parameters of the actual IC that may be specified in the part specification of the IC.

It should be appreciated that while the DFx IP cores 150 are described as being different DFx IP cores, each different DFx IP core 150 (e.g., 150-1, 150-2, etc.) may be created as an instance of a particular DFx IP core. Each instance of the DFx IP core is separately and independently parameterizable. As such, each DFx IP core (e.g., each instance of the DFx IP core) may be parameterized with a user parameterization that specifies which of the aforementioned functions are to be controlled by the instance of the DFx IP core. Each DFx IP core of FIG. 1 may be parameterized the same or differently. The DFx IP core includes the control logic for controlling operation and collecting status information for the various functions described based on the user parameterization.

With conventional IC design techniques, each of the various functions described above is independently developed for inclusion in the IC by the designers of the different subsystems to be included in the IC. Thus, to the extent such functions were included for particular hard IP cores, the designers of the respective hard IP cores typically created custom solutions to implement the testing functionality desired for the hard IP core. As such, each design team for a different subsystem of the IC effectively recreated the particular DFT functions needed for that subsystem.

The DFx architecture described herein facilitates convergence and standardization of the various DFx functions that may be included in hard IP cores. The convergence facilitates re-use of logic across different DFx functions and reduces area overhead in the IC. The DFx IP core is capable of providing uniform control over these different DFx functions through incorporation of a DFx IP core (e.g., instantiation) therein. By including the controls for the different DFx functions within a single DFx IP core that may be provided and distributed to different design teams involved with creating a design for an IC, the DFx IP core functionality is standardized throughout the IC. In using the DFx IP core, each different design team of a subsystem of an IC need not worry about any aspect of the DFx design as the DFx functionality is encapsulated by the DFx IP core.

Figure 2:
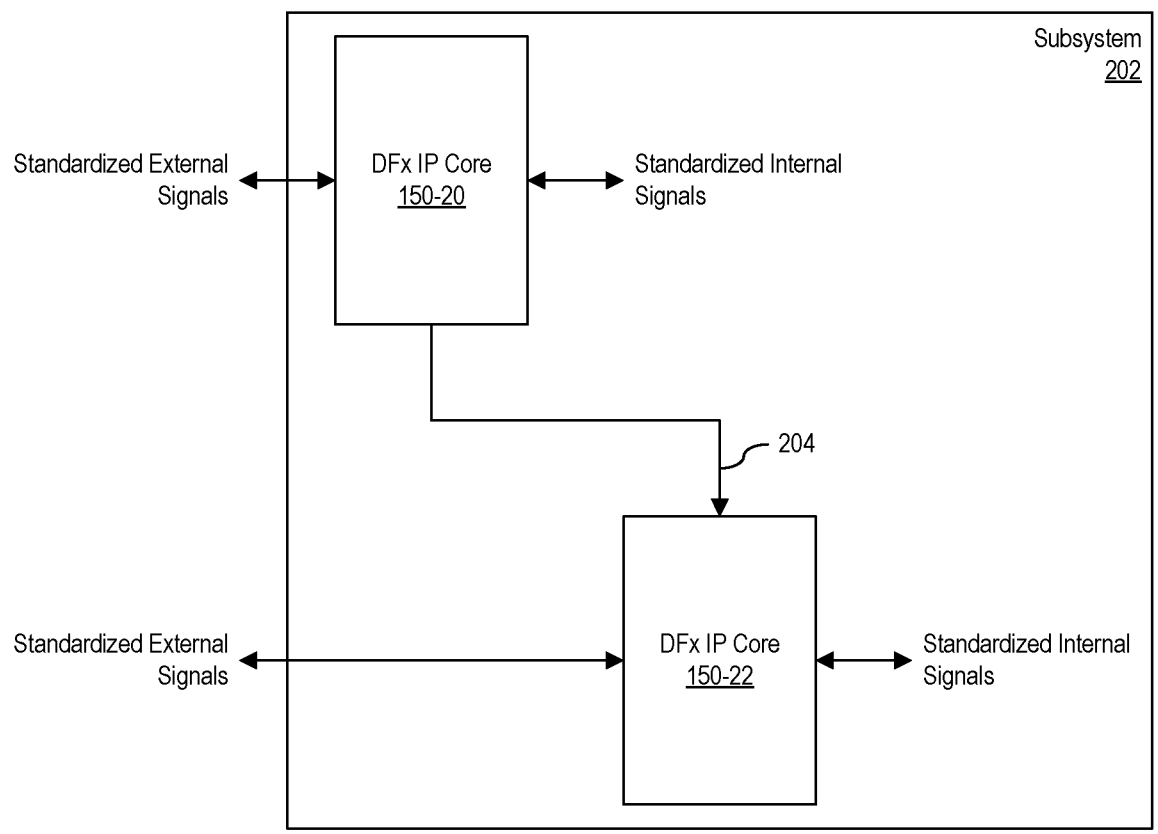
FIG. 2 illustrates example hierarchy implemented using the DFx Intellectual Property (IP) core described in connection with FIG. 1.

FIG. 2 illustrates an example hierarchy implemented using the DFx IP core described in connection with FIG. 1. For purposes of illustration, FIG. 2 shows a subsystem 202 (e.g., an IP core) including DFx IP core 150-20 and DFx IP core 150-22 (e.g., each being an instance of the DFx IP core). DFx IP core 150-20 may be at level "N" of the hierarchy, while DFx IP core 150-22 is at level "N+1" of the hierarchy. DFx IP core 150-20 is connected to DFx IP core 150-22 via a hierarchy enable signal 204. In general, to access the control functionality provided by DFx IP core 150-22, DFx IP core 150-22 must first be enabled. DFx IP core 150-22 is enabled by DFx IP core 150-20 asserting hierarchy enable signal 204. For example, a user may set a particular bit of a control register in DFx IP core 150-20 that causes DFx IP core 150-20 to assert hierarchy enable signal 204 to DFx IP core 150-22. DFx IP core 150-22 may not be enabled without first enabling DFx IP core 150-20. DFx IP core 150-20, for example, may in turn need to be first enabled by the DFx IP core 150 in the level above that of DFx IP core 150-20, etc.

FIG. 2 also illustrates that each DFx IP core 150 provides a first interface, e.g., an "outward facing interface," that is configured to couple to external signals (e.g., signals external to subsystem 202) and a second interface, e.g., an "inward facing interface," that is configured to couple to circuitry within subsystem 202. As illustrated, the first interface of each DFx IP core 150 receives a set of standardized external signals that may include standardized external control signals and standardized external data signals. The second interface of each DFx IP core 150 provides a set of standardized internal signals that may include standardized internal control signals and standardized internal data signals.

In one aspect, the standardized external signals may be conveyed over a chip and/or system level circuit infrastructure capable of conveying control signals and/or data signals that conform to a particular communication protocol hereafter referred to as "control infrastructure circuitry." The control infrastructure circuitry may follow an open standard or be proprietary. Within this disclosure, Internal Joint Test Action Group (IJTAG) is used as an example of control infrastructure circuitry. IJTAG may be used to refer to circuitry configured to operate in accordance with IEEE 1687. Though IJTAG is used within this disclosure for purposes of illustration, as noted, other types of control infrastructure circuitry conforming to a predetermined standard, whether an open standard or a proprietary standard, may be used.

Similarly, the standardized internal signals may conform to a control infrastructure circuitry used within the circuit block in which the instance of the DFx IP core 150 is included. Appreciably, the control infrastructure circuitry that couples to the outward facing interface of the instance of the DFx IP core 150 may differ from the control infrastructure circuitry that couples to the inward facing interface of the instance of the DFx IP core 150.

Figure 3:
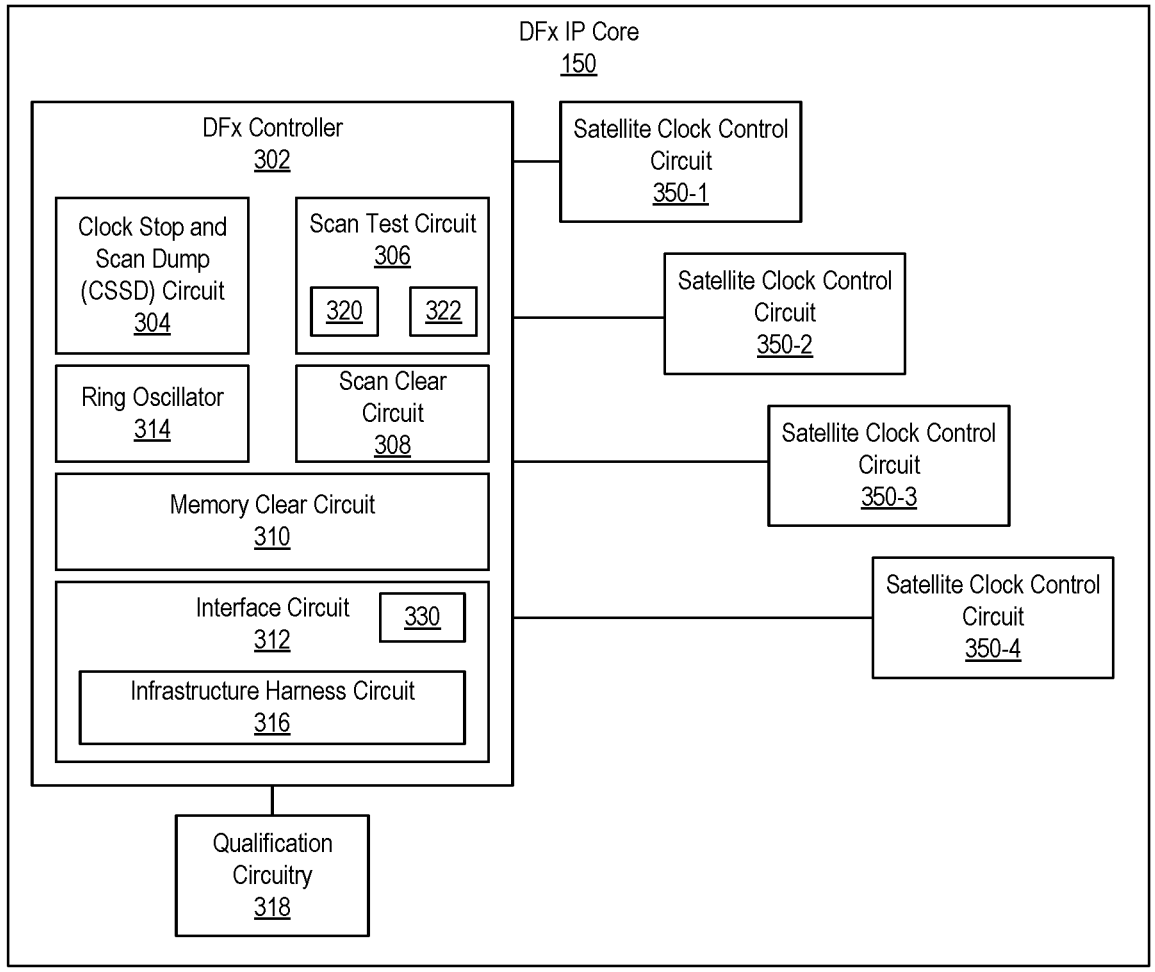
FIG. 3 illustrates an example implementation of a DFx IP core described in connection with FIG. 1.

FIG. 3 illustrates an example implementation of a DFx IP core 150. In the example of FIG. 3, DFx IP core 150 includes a DFx controller 302 and one or more satellite clock control circuits 350.

DFx controller 302 is capable of implementing shared circuitry used by DFx IP core 150 and the particular subsystem in which DFx IP core 150 is included. In an example implementation, DFx controller 302 is itself an independent IP core. DFx controller 302 may be integrated inside each circuit block or host IP core in which an instance of DFx IP core 150 is included. DFx controller 302 is capable of operating independently of any other instances of the DFx controller in the host IP core, subsystem, or IC.

In the example, DFx controller 302 includes a Clock Stop and Scan Dump (CSSD) circuit 304, a scan test circuit 306, a scan clear circuit 308, a memory clear circuit 310, an interface circuit 312, and a ring oscillator 314. DFx controller 302 may also include an infrastructure harness circuit 316. Each of circuit blocks 304, 306, 308, 310, and 312 may be implemented as control circuitry for the particular DFx function or group of DFx functions indicated.

For example, CSSD circuit 304 includes circuitry for controlling debugging (e.g., silicon debugging) functions within the particular subsystem in which DFx IP core 150 is located. Example debugging functions may include, but are not limited to, scan dump and memory dump. In one aspect, CSSD circuit 304 may function as a main clock controller within each DFx IP core 150. CSSD circuit 304, for example, is capable of stopping the various clocks of a given subsystem via asynchronous communication with respective satellite clock control circuits 350.

Scan test circuit 306 includes circuitry for controlling scan test functions for the particular subsystem in which DFx IP core 150 is included. Scan test functions may include, but are not limited to, scan-based logic testing and memory tests (e.g., MBIST). Scan test circuit 306 may include a decompressor circuit 320 and a compactor circuit 322 for performing scan tests.

In another example implementation, scan test circuit 306 may include memory repair control logic that is capable of providing connectivity (e.g., control and/or status) for memory repair logic. The memory repair logic (not shown) may be implemented within DFx controller 302 or may be located external to DFx controller 302.

Scan clear circuit 308 includes circuitry for controlling scan clear functions for the particular subsystem in which DFx IP core 150 is included. Memory clear circuitry 310 includes circuitry for controlling memory clear functions (e.g., MBIST) for the particular subsystem in which DFx IP core 150 is included. Memory clear circuitry 310, for example, may control memory initialization functions. Ring oscillator 314 may be a self-contained ring oscillator that may be used for purposes of characterization of the particular subsystem in which DFx IP core 150 is included.

Interface circuitry 312 includes circuitry for receiving and/or generating certain control and/or data signals for the particular subsystem in which DFx IP core 150 is included. In the example, interface circuitry 312 includes infrastructure harness circuit 316. Interface circuitry 312 may also include an encoder circuit 330. Infrastructure harness circuit 316 may implement the outward facing interface that couples to the external control infrastructure circuitry and the inward facing interface that couples to the internal control infrastructure circuitry. In one aspect, infrastructure harness 316 provides access to a DFx control and status grid in the design at a next higher level of assembly that allows access to block level DFx functionality from all levels of hierarchy and assembly. As such, a new IP core or a new subsystem with infrastructure harness circuit 316 incorporated therein need only connect to the infrastructure control grid at the next higher level of hierarchy. Infrastructure harness circuit 316 may also implement the inward facing interface.

In the example, DFx IP core 150 includes 4 satellite clock control circuits 350-1, 350-2, 350-3, and 350-4. In general, each DFx IP core 150 will include one satellite clock control circuit 350 (e.g., one instance of the satellite clock control circuit) for each clock domain in the subsystem in which DFx IP core 150 is included. Each satellite clock control circuit 350 is capable of operating as a switch or multiplexer for controlling the particular clock signal of the clock domain associated with the respective satellite clock control circuit 350.

In one example implementation, satellite clock control circuits 350 are included in the same logic hierarchy as DFx IP core 150. Though part of the same IP core and logic hierarchy, each satellite clock control circuit 350 may be physically moved around IC 100 as opposed to being located in a particular location proximate to, or determined by, DFx controller 302. For example, DFx IP core 150 may be implemented at a particular location that need not be close to the clocks generated for the subsystem in which DFx IP core 150 is included. Each satellite clock control circuit 350 may be placed at a location that is proximate to the clock source that the satellite clock control circuit 350 controls.

As an example, if satellite clock control circuit 350-1 controls clock source 1, satellite clock control circuit 350-1 may be placed at a location in IC 100 that is within a predetermined distance of clock source 1. Similarly, satellite clock control circuit 350-2 may control clock source 2 and be placed at a location in IC 100 that is within a predetermined distance of clock source 2. DFx controller 302 and/or qualification circuitry 318 may be located farther away from the clock control circuits 350. In other example implementations, satellite clock control circuits 350 may be outside of DFx controller 302 both logically and physically.

The example of FIG. 3 is provided for purposes of illustration and not limitation. While some subsystems may include a single clock signal, in other cases, subsystems include many more clock signals (e.g., 70 or more clock signals for a given subsystem). DFx IP core 150, including satellite clock control circuits 350 as described, allows DFx controller 302 to be located nearly anywhere for a given subsystem, while locating the different satellite clock control circuits 350 close to the particular clock signal controlled by each respective satellite clock control circuit 350.

In one aspect, the flexibility to place DFx controller 302 at varying locations untethered from the location of the clock sources in a subsystem arises from using asynchronous communication between DFx controller 302 and satellite clock control circuits 350. That is, while DFx controller 302 exercises control over the respective satellite clock control circuits 350, DFx controller 302 does not directly affect the clocks of the subsystem. Satellite clock control circuits 350 exert direct control over the clocks of the subsystem. This provides designers the freedom to locate the satellite clock control circuits close to the particular clock source controlled by each respective satellite clock control circuit without regard for the distance between the satellite clock control circuit and the DFx controller.

Figure 9:
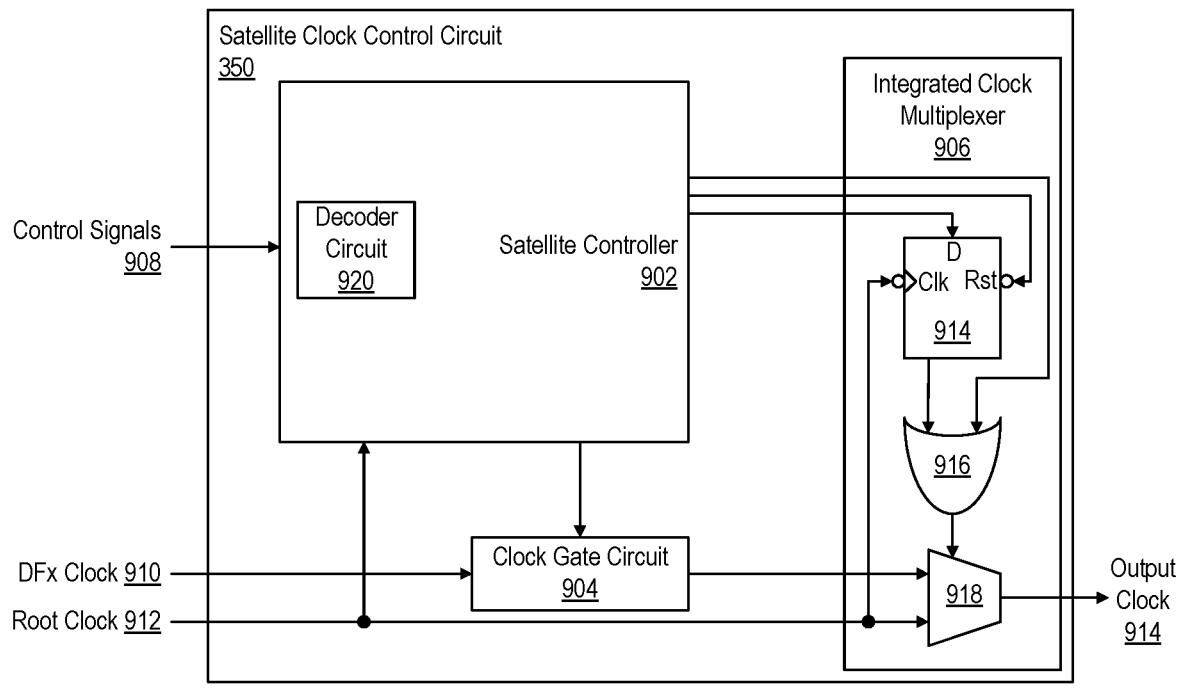
FIG. 9 illustrates an example implementation of a satellite clock control circuit.

In one or more example implementations described herein, the wires connecting DFx controller 302 and the satellite clock control circuits 350 (e.g., satellite controllers within the respective satellite clock control circuits 350 as illustrated in FIG. 9) may be encoded in DFx controller 302 (e.g., by encoder circuit 330) and decoded in satellite clock control circuits 350 (e.g., in the respective satellite controllers). By encoding in DFx controller 302 and decoding in the satellite clock control circuits 350, the number of routing channels or wires that are needed to convey values may be reduced and/or minimized. For example, if N different values must be conveyed, the number of wires used to convey the values may be reduced to log N wires through encoding rather than using N wires. In other example implementations, values may be time-division multiplexed to used fewer wires than values being conveyed. As noted, since all wires connecting DFx controller 302 with satellite clock controller circuits 350 may be asynchronous, there is no need to apply clocking, pipelining, and/or timing constraints to the wires. The use of encoding/decoding and asynchronous communication as described provides added flexibility in that satellite clock control circuits 350 may be moved or located virtually anywhere needed within an IC relative to the placement of DFx controller 302 without limitation.

Another benefit of the DFx architecture described herein is that DFx controller 302 need not run at the same speed as satellite clock control circuits 350. DFx controller 302 may operate with a clock having a frequency that is slower than the clock frequency used for satellite clock control circuits 350. In some cases, the clock frequency used for DFx controller 302 may be significantly slower than the clock frequency of satellite clock control circuits 350.

As noted, each instance of a DFx IP core 150 may be parameterized according to a user parameterization. The user parameterization, which is specific to each instance of a DFx IP core 150, may specify which of the available DFx functions or features are implemented by DFx IP core 150. For example, the user parameterization may specify whether particular circuit blocks such as scan test circuit 306, scan clear circuit 308, memory clear circuit 310, and/or IJTAG circuit 312 are included in DFx controller 302.

In an example implementation, one or more circuit blocks (e.g., features) of DFx IP core 150 may be mandatory. Scan test (e.g., scan test circuit 306), for example, may be a mandatory feature of DFx IP core 150. By comparison, scan and memory clear (e.g., scan clear circuit 308) may be optional features of DFx IP core 150. In the case of mandatory features, the parameterization still may specify parameters defining certain aspects or sub-features of the mandatory feature(s) of the DFx IP core 150. For purposes of illustration, in the case where scan test is mandatory, a user parameterization may specify the number of scan chains implemented by the DFx IP core 150. In this regard, multiple levels of parameters may be needed to fully or properly instantiate a DFx IP core 150 and DFx controller 302.

In one aspect, the user parameterization also specifies the number of clock signals included in the subsystem and, as such, the number of satellite clock control circuits 350 that are implemented. For each satellite clock control circuit 350 that is implemented, the user may also assign or create location constraints that dictate the proximity of the satellite clock control circuit to the particular clock source that generates the clock signal controlled by that satellite clock control circuit. For example, the constraint may specify a maximum distance that a satellite clock control circuit may be located from the clock port or clock source generating the clock signal controlled by the satellite clock control circuit.

In another aspect, a script may be packaged, or included, in DFx IP core 150. Execution of the script may cause an Electronic Design Automation (EDA) system, e.g., a computer, to automatically determine the number of clock sources included in the subsystem and, as such, automatically determine the number of satellite clock control circuits 350 that are implemented. The script also may automatically associate each satellite clock control circuit (e.g., instance thereof) with a particular clock source of the subsystem and create default location constraints that dictate the proximity of each satellite clock control circuit to the particular clock source associated with, and controlled by, that satellite clock control circuit.

In the example of FIG. 3, CSSD circuit 304 is capable of communicating a clock stop signal to the respective satellite clock control circuits. Other blocks such as scan test circuit 306, scan clear circuit 308, memory clear circuit 310, and interface circuit 312 may also interact with satellite clock control circuits 350 to implement and/or control the various testing functions described. Ring oscillator 314 need not interact with satellite clock control circuits 350.

As noted, in the example of FIG. 3, interface circuit 312 includes infrastructure harness circuit 316. Infrastructure harness circuit 316 is capable of implementing the outward facing interface and the inward facing interface. For purposes of illustration, the outward facing interface may include an outward facing IJTAG network or interface and the inward facing interface may implement an inward facing IJTAG network or interface. The outward facing interface provides connectivity between DFx controller 302 and the control infrastructure circuitry outside DFx IP core 150 that is implemented in IC 100. The inward facing interface provides control and status for the control infrastructure circuitry within the particular circuit block in which the DFx IP core 150 resides. Other circuit blocks in the circuit block including the DFx IP core 150 may couple to the inward facing interface as well as one or more circuit blocks of DFx controller 302 (e.g., circuit blocks 304, 306, 308, 310, 350, and/or 314) thereby providing control over such circuit blocks by virtue of connecting the circuit blocks to the control infrastructure circuitry of the next higher level of hierarchy of IC 100. The infrastructure harness circuit 316 is described in greater detail in connection with FIGS. 4, 5, 6, 7A, and 7B.

In the example of FIG. 3, qualification circuitry 318 also is included. Qualification circuitry 318 is coupled to DFx controller 302. Qualification circuitry is capable of performing a variety of functions. These functions may include, for example, resiliency to soft errors by implementing triplication on signals prior to the signal(s) leaving DFx IP core 150. Qualification circuitry 318 may perform other checks such as ensuring that potentially conflicting functions controlled by DFx controller 302 are not activated or turned on concurrently and/or preventing DFx controller 302 from entering a particular testing mode unnecessarily.

Qualification circuitry 318 is capable of preventing DFx controller 302 from activating or turning on conflicting functions concurrently. Qualification circuitry 318, for example, may implement one or more operation rules (e.g., a state machine) to prevent DFx controller 302 from entering illegal states.

As an illustrative and non-limiting example, scan-based logic test may be implemented separately from memory test. The two are not activated concurrently. When one of scan-based logic test or memory test is turned on, qualification circuitry 318 is capable of preventing the other from being turned on at least until the conflicting function is turned off. In another example, scan dump is not typically performed concurrently with memory dump. A scan dump may be performed to observe the scan. Memory contents may then be observed. When the contents of flip-flops (FFs) are shifted out, the contents of memory are protected during that time. Once the contents of the FFs are shifted out, the contents of the memory may be shifted out. When one of scan dump or memory dump is turned on, qualification circuitry 318 is capable of preventing the other function from being turned on at least until the conflicting function is turned off. In still another example, for initialization, while scan clear is performed, the contents of memory are typically protected. Thus, while scan clear is turned on, qualification circuitry 318 is capable of preventing memory clear from being turned on at least until the conflicting function is turned off.

Figure 4:
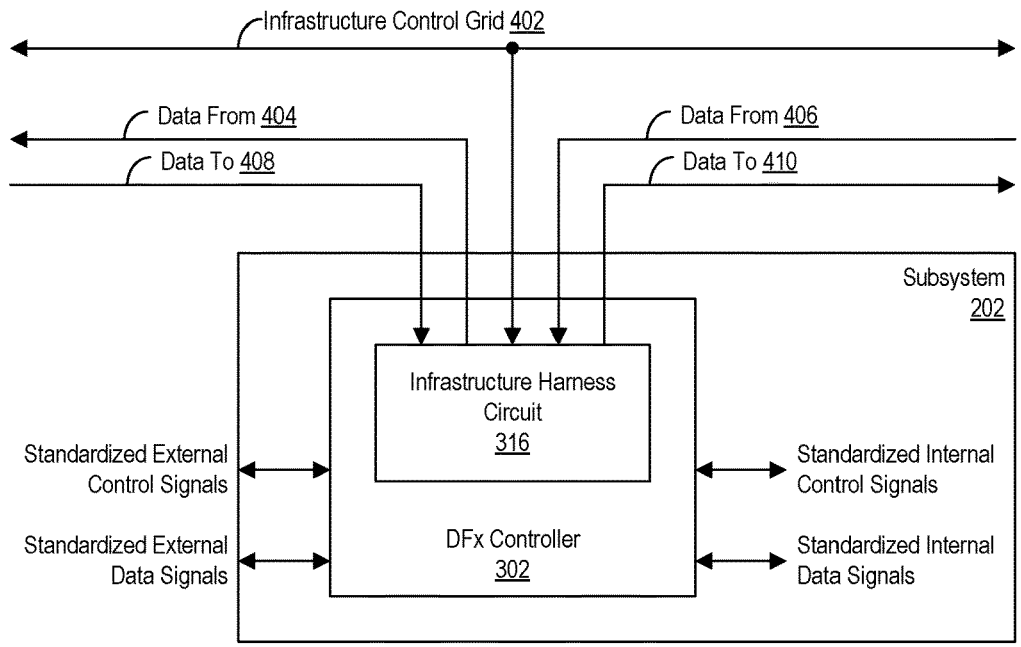
FIG. 4 illustrates example connectivity provided by a DFx controller of a DFx IP core.

FIG. 4 illustrates an example showing connectivity of DFx controller 302. In the example of FIG. 4, infrastructure harness circuit 316 is coupled to control infrastructure circuitry external to subsystem 202 and control infrastructure circuitry within subsystem 202. The control infrastructure circuitry external to subsystem 202 includes infrastructure control grid 402, data from 404, 406, data to 408, 410, standardized external control signals, and standardized external data signals.

In the example, infrastructure control grid 402 refers to IJTAG control signals that may be distributed throughout IC 100. In one aspect, infrastructure control grid 402 is the infrastructure control grid for the module above subsystem 202 in the design hierarchy for IC 100. The owner or designer of subsystem 202 ensures that subsystem 202 has a connection to infrastructure control grid 402.

As an example, infrastructure control grid 402 may include IJTAG control signals such as "clock," "shift," "capture," "update," "select," and "reset_tap." The "data to" and "data from" signals may be IJTAG data signals. For example, the data from signal 404 may be the "ijtag_return_tdo_ext" signal. The data from signal 406 may be the "ijtag_return_tdi_ext" signal. The data to signal 408 may be the "ijtag_tdi_ext" signal. The data to signal 410 may be the "ijtag_tdo_ext" signal.

Standardized external control signals may include one or more controls signals provided from one or more circuit blocks of DFx controller 302 that may be needed to control the DFx functions implemented, wherein such control signals are not provided by, or available from, infrastructure control grid 402. Standardized external data signals may include one or more data signals that provide data needed for the DFx functions implemented that are not provided by signals 404, 406, 408, and/or 410.

Figure 5:
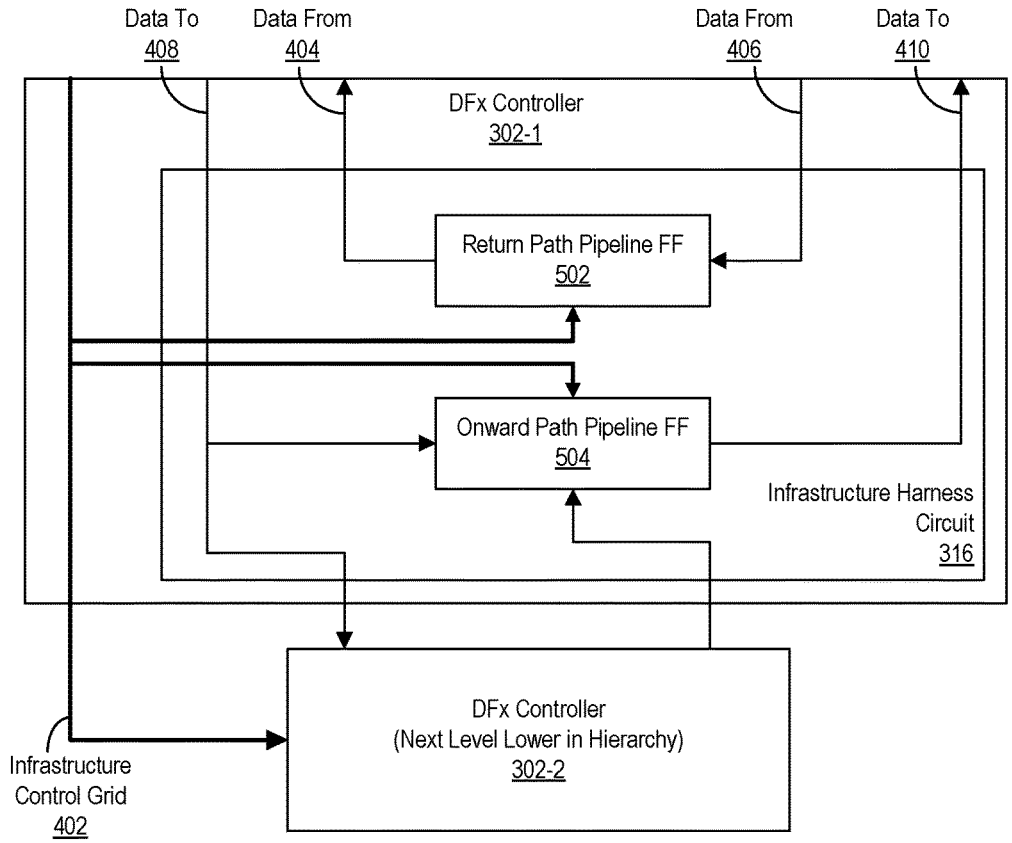
FIG. 5 illustrates another example of DFx controller connectivity within a hierarchical arrangement.

FIG. 5 illustrates another example showing connectivity of DFx controllers within a hierarchy. In the example of FIG. 5, DFx controller 302-1 is coupled to DFx controller 302-2. FIG. 5 illustrates connectivity between both DFx controllers, where DFx controller 302-1 is one level above DFx controller 302-2 in the hierarchy.

In the example, infrastructure harness circuit 316 includes one or more return path pipeline flip-flops (FFs) 502 and one or more onward path pipeline FFs 504. FIG. 5 illustrates how the infrastructure control grid 402, data from signals 404, 406, and data to signals 408, 410 are coupled to infrastructure harness circuit 316 and DFx controller 302-2 of the next level down in the hierarchy.

Figure 6:
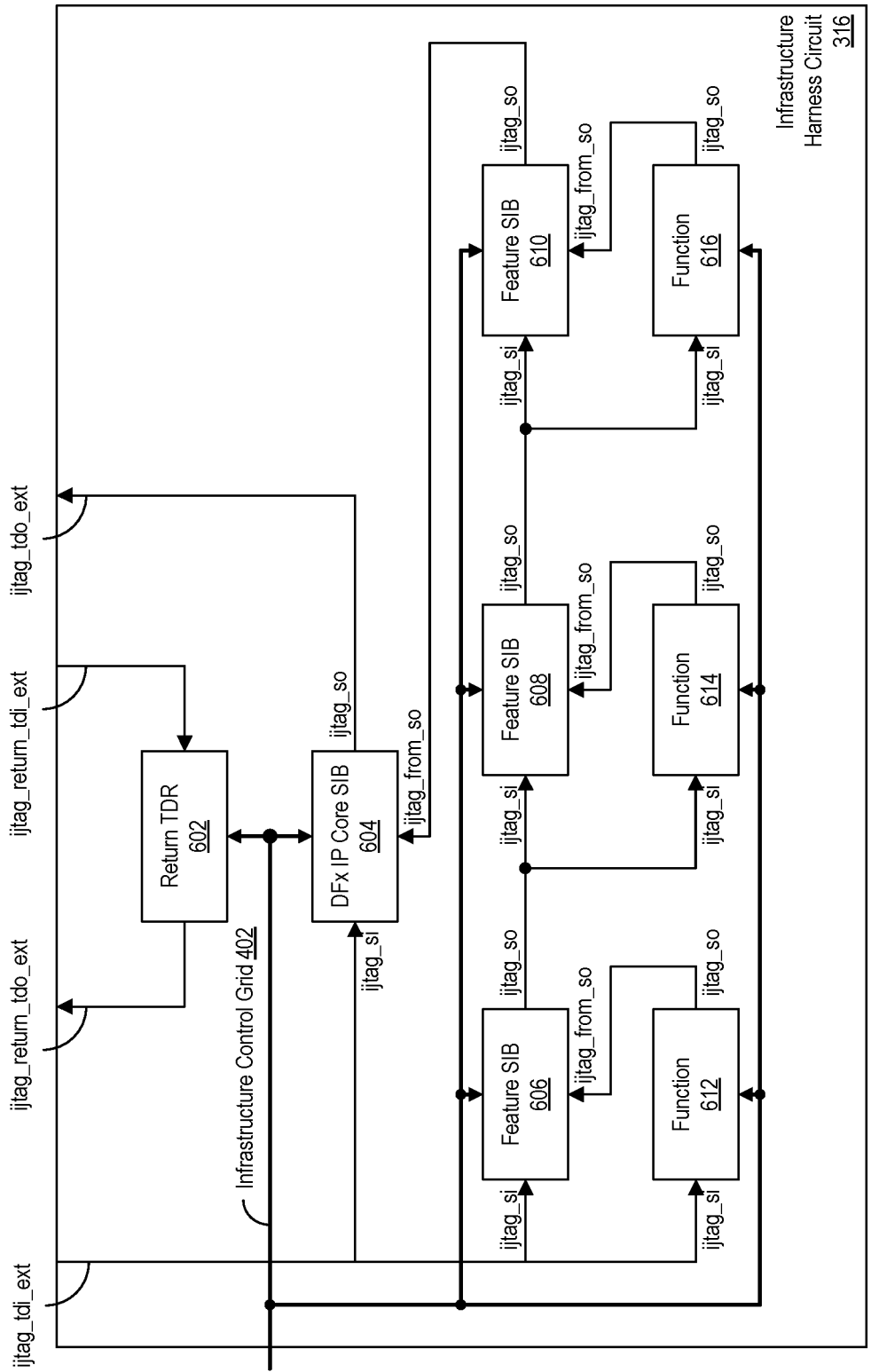
FIG. 6 illustrates an example implementation of an internal network of an infrastructure harness circuit.

FIG. 6 illustrates an example implementation of the internal network of infrastructure harness circuit 316 using IJTAG as an example. In the example of FIG. 6, the bold lines represent signals of infrastructure control grid 402. These signals include IJTAG controls signals such as, for example, "clock," "shift," "capture," "update," "select," and "reset_tap." Other signals illustrated in FIG. 6, for example, "ijtag_tdi_ext," "ijtag_return_tdo_ext," "ijtag_return_tdi_ext," "ijtag_tdo_ext," "ijtag_si," "ijtag_so," and "ijtag_from_so" represent IJTAG data signals. In the example of FIG. 6, "ijtag_tdi_ext" corresponds to data to signal 408; "ijtag_return_tdo_ext" corresponds to data from signal 404; "ijtag_return_tdi_ext" corresponds to data from signals 406; and "ijtag_tdo_ext" corresponds to data to signal 410. For purposes of discussion, "tdo" refers to "test data out," "tdi" refers to "test data in," "so" may be a tdo that is specific to the feature SIB and refers to "shift-out," and "si" may be a tdi that is specific to the feature SIB and refers to "shift-in."

In the example of FIG. 6, the IJTAG network includes a return TDR 602 coupled to ijtag_return_tdo_ext and to ijtag_return_tdi_ext. TDR return 602 corresponds to return path pipeline FF 502 of FIG. 5. Return TDR 602 is further connected to infrastructure control grid 402. The IJTAG network includes a hierarchy of Segment Insertion Bit (SIB) circuits. Signals of the infrastructure control grid 402 are also connected to the various SIBs and functions shown. DFx IP core SIB 604 is the top-level SIB of infrastructure harness circuit 316 and is configured to enable the DFx IP core 150 in which infrastructure harness circuit 316 is located. That is, if one wishes to access any of the various functions provided by DFx IP core 150, then a bit must be set in DFx IP core SIB 604. Once the bit in DFx SIB 604 is set, any of functions 612, 614, and/or 616 may be activated by setting bits in the respective ones of feature SIBs 606, 608, and/or 610. Without setting the bit in DFx IP core SIB 604, none of functions 612, 614, or 616 may be used. In this regard, DFx IP core SIB 604 operates as an enable for the entire DFx IP core 150. The inward facing IJTAG network provided by infrastructure harness circuit 316 may be connected through DFx IP core SIB 604, which is the top-level SIB of DFx controller 302. DFx IP core SIB 604 corresponds to onward path pipeline FF 504 of FIG. 5.

Functions 612, 614, and 616 represent one or more of the different DFx functions that may be provided by DFx IP core 150. Functions 612, 614, and/or 616 may be turned on and off on an individual basis independently of one another. In one aspect, functions 612, 614, and/or 616 represent scan test circuit 306, scan clear circuit 308, and/or memory clear circuit 310, where each circuit block may be controlled by its own SIB. In another aspect, each individual function provided by DFx IP core 150 may be controlled by a SIB. For example, each of functions 612, 614, and/or 616 may represent a function such as scan based logic test, memory test, scan dump, memory dump, scan clear, memory clear, memory repair, and/or ring oscillator. Each of these various functions may be controlled by its own SIB (e.g., where blocks such as scan test block 306 may provide a plurality of functions with each such function being controlled by a different SIB). Once DFx IP core 150 is enabled by way of setting the bit in DFx IP core SIB 604, any one or any combination of functions 612, 614, and/or 616 may be enabled (e.g., turned on) by writing a bit to the corresponding feature SIB 606, 608, and/or 610.

In another example implementation, an IC may include a main controller circuit block that is also capable of triggering one or more functions via DFx controller 302. For example, a main controller circuit block of the IC may be coupled to DFx controller 302 and be capable of triggering one or more DFx functions such as scan clear and memory clear using some type of arbitration.

For purposes of illustration, consider feature SIB 606. In the case where the control bit of feature SIB 606 is not set, feature SIB 606 does not pass the "ijtag_from_so" signal from function 612. In the case where the control bit of feature SIB 606 is set, feature SIB 606 does pass the "ijtag_from_so" signal from function 612. Each other feature SIB and function combination may operate in similar manner.

Functions are included in an instance of DFx IP core 150 based on the user parameterization for that instance. For each function of DFx IP core 150 enabled by a given user parameterization, such functions are included in the parameterized instance of DFx IP core 150 along with a feature SIB as shown. As such, each instance of DFx IP core 150 includes only those functions and a corresponding feature SIB for each if such functions were enabled by the user parameterization for the instance.

As an illustrative and non-limiting example, if the memory clear function is not needed (e.g., the subsystem including the instance of the DFx IP core 150 does not include a memory array), the memory clear function may be omitted in the instance based on the user parameterization. In the example of FIG. 6, the user parameterization of DFx IP core 150 has enabled 3 different ones of the DFx functions provided.

In one or more example implementations, certain DFx functions described herein may be included in DFx IP core 150 by default. The DFx functions included by default and may not be omitted. Other ones of the DFx functions may be selectively included in DFx IP core 150 based on the provided user parameterization.

Figure 7A:
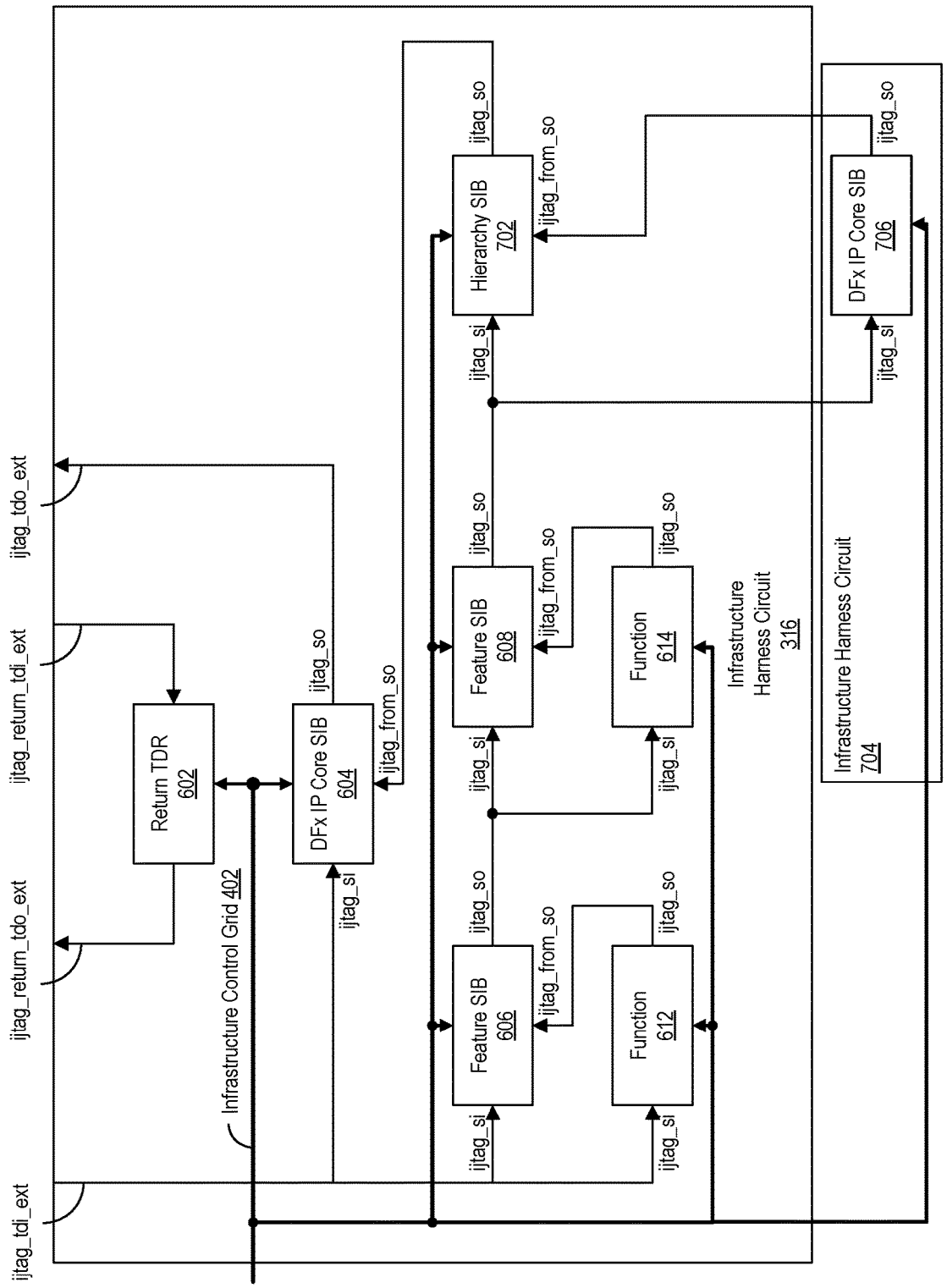
FIGS. 7A and 7B illustrate other example implementations of an internal network of an infrastructure harness circuit.
Figure 7B:
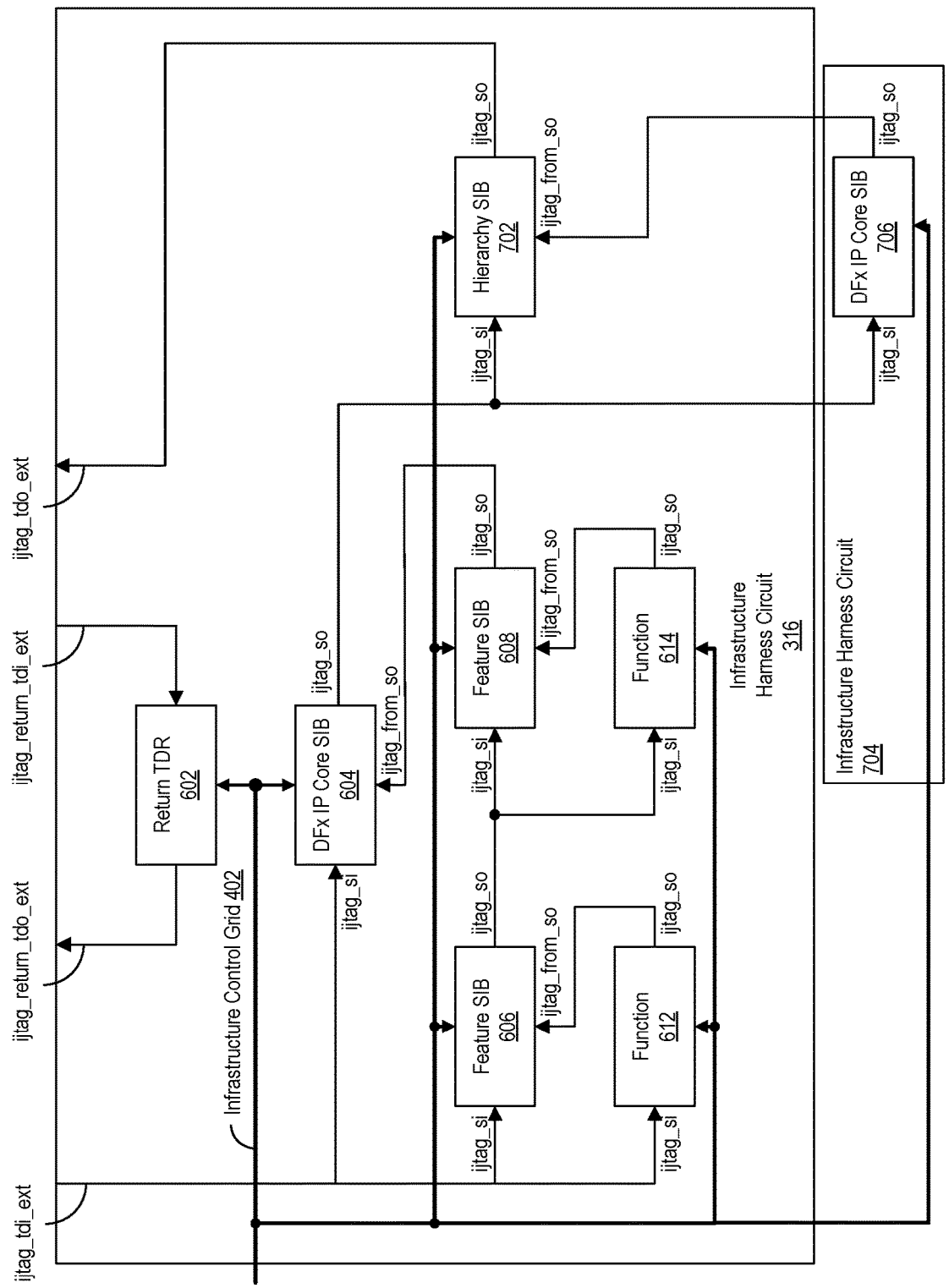

FIGS. 7A and 7B illustrate other example implementations of the internal network provided by infrastructure harness circuit 316. In the example of FIG. 7A, the user parameterization indicates that the DFx IP core 150 that includes infrastructure harness circuit 316 is used to selectively enable another DFx IP core of a next level down in the hierarchy. In that case, infrastructure harness circuit 316 includes a hierarchy SIB 702. Hierarchy SIB 702 is not used to control activation of a function, but rather to set or clear the control bit of the DFx IP core SIB of the DFx IP core controlled by the DFx IP core of FIG. 7A. That is, hierarchy SIB 702 may be used to set the control bit of DFx IP core SIB 706 of infrastructure harness 704 (where infrastructure harness 704 is within a different DFx IP core than infrastructure harness 316). Further functions of the DFx IP core including DFx IP core SIB 706 may be individually enabled once the control bit of DFx IP core SIB 706 is set. The example of FIG. 7B shows another implementation where hierarchy SIB 702 is at the same level of hierarchy as DFx IP core SIB 604 rather than being one level down therefrom as shown in FIG. 7A.

In the examples of FIGS. 6, 7A, and 7B, the qualification circuit 318 is capable of exercising control over which features of DFx IP core 150 are turned on by preventing writing to particular SIBs. When a first function is activated by writing to the SIB of that function, qualification circuit 318 is capable of preventing the SIB of any conflicting function from being written thereby preventing the conflicting feature from being turned on at least while the other function remains on.

Figure 8:
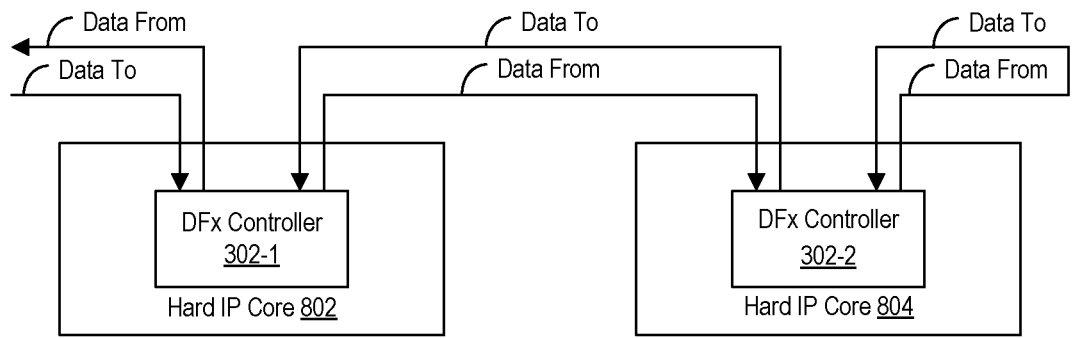
FIG. 8 illustrates example connectivity between different DFx controllers included in different hard IP cores.

FIG. 8 illustrates example connectivity between different DFx controllers included in different hard IP core. In the example of FIG. 8, hard IP core 802 includes DFx controller 302-1. Hard IP core 804 includes DFx controller 302-2. Connectivity between DFx controllers 302-1 and 302-2 using the "data to" and "data from" signals is shown.

FIG. 9 illustrates an example implementation of a satellite clock control circuit 350. In the example of FIG. 9, satellite clock control circuit 350 includes a satellite controller 902, a clock gate circuit 904, and an integrated clock multiplexer 906. Satellite controller 902 receives control signals 908 from DFx controller 302. In one aspect, satellite controller 902 includes a decoder circuit 920 configured to decode control signals 908. Control signals 908 may be generated by the various circuit blocks included in DFx controller 302 including infrastructure harness circuit 316. Clock gate circuit 904 receives DFx clock 910. DFx clock 910 typically has a different and slower frequency than that of root clock 912. DFx clock 910 may be any of a variety of different clock signals. For example, DFx clock 910 may be an external scan clock, an infrastructure control grid (e.g., IJTAG) clock, or another clock generated internal within IC 100. Root clock 912, for example, is the particular clock signal that is controlled by satellite clock control circuit 350. Root clock 912 may also be referred to herein as the "at speed clock." DFx clock 910 may be controlled by DFx controller 302 and may be referred to herein as the "scan clock." Both root clock 912 and DFx clock 910 may be used for various functions described hereinbelow.

Integrated clock multiplexer 906 is capable of switching between DFx clock 910 (e.g., as output from clock gate circuit 904) and root clock 912 synchronously without any glitching. Root clock 912 is expected to be a free-running clock. In the example of FIG. 9, multiplexer 918 is not a glitch-free multiplexer. Glitch free multiplexers do not provide deterministic switching times or exact clock counts. Unlike a glitch free multiplexer, the circuit architecture implemented in integrated clock multiplexer 906 achieves glitch free operation while providing deterministic performance.

Integrated clock multiplexer 906 includes a latch 914, an OR gate 916, and a multiplexer 918. In one aspect, integrated clock multiplexer 906 may be implemented as a single hardened cell. As shown, latch 914 may be controlled by satellite controller 902. The output from latch 914, in combination with another control signal from satellite controller 902, are provided to the inputs of OR gate 916. The output of OR gate 916 is provided to multiplexer 918 as a select signal. Thus, based on the value of the output from OR gate 916, multiplexer 918 passes either DFx clock 910 or root clock 912 as output clock 914 to the particular components of the subsystem ordinarily clocked by root clock 912. DFx clock 910 may be gated by clock gate circuitry 904 under control of satellite controller 902 allowing satellite clock control circuit 350 to output a static clock signal as well.

The example of FIG. 9 illustrates that root clock 912, i.e., the clock signal controlled by satellite clock control circuit 350 of FIG. 9, only passes through multiplexer 918 of satellite clock control circuit 350. By reducing or minimizing the amount of circuitry in satellite clock control circuit 350 through which root clock 912 passes, certain electrical characteristics such as delay (e.g., insertion delay), jitter, duty cycle distortion, and the like on root clock 912 are not introduced or at least minimized. As such, when a satellite clock control circuit 350 is included within a particular subsystem to control a given clock, the only component that affects root clock 912 that should be accounted for is multiplexer 918. Other aspects of clock control regarding root clock 912 are handled by way of the select line output from OR gate 916.

Controller 902 receives root clock 912 and also includes synchronization circuitry (not shown). The synchronization circuitry ensures that switching back and forth between DFx clock 910 and root clock 912 by multiplexer 918 is synchronous with respect to root clock 912. Synchronous switching is achieved using the synchronization circuitry in satellite controller 902 receiving root clock 912 and operating to control latch 914 and OR gate 916.

In cases where satellite clock control circuit 350 switches from root clock 912 to DFx clock 910, clock gate circuit 904 may initially gate DFx clock 910. Satellite clock control circuit 350 may, operating under control of DFx controller 302, selectively gate DFx clock 910 based on the particular DFx function of DFx IP core 150 that is being used.

The following discussion illustrates various operational features of satellite clock control circuit 350 and, more particularly, satellite controller 902. Satellite controller 902, as illustrated, is capable of providing control signals to clock gate circuit 904 and the components of integrated clock multiplexer 906 to implement the features described below. By controlling integrated clock multiplexer 906 as described, the output of multiplexer 918 drives clocks of all flip-flops in part of the design. Clock control for the various DFx functions described within this disclosure may be implemented through timely manipulation of the select line to multiplexer 918 and timely manipulation of clock gate circuit 904 by satellite controller 902.

For purposes of illustration, consider a first use case involving a scan-based test of delay faults. In the first use case, root clock 912 is free running at a required frequency. The required frequency may be the full or top functional frequency. The select line from OR gate 916 to multiplexer 918 is initially selecting DFx clock 910 while DFx clock 910 is held silent (e.g., static) at 0 by clock gate circuit 904. A test stimulus is shifted into scan chains by pulsing DFx clock 910 using clock gate circuit 904. Enabling clock gate circuit 904 to allow DFx clock 910 to transition allows DFx clock 910 to be used during scan-shift as a scan clock. During this time while test stimulus is shifted into scan chains, the select line of multiplexer 918 selects DFx clock 910, as output from clock gate circuit 904.

Once the test stimulus has been shifted into the scan chains, the circuit under test transitions to a response-capture mode for which two pulses of the free-running root clock 912 are needed. The two pulses may be provided to the circuit under test by switching the select line of multiplexer 918 to select root clock 912 for the exact duration needed to allow two pulses of root clock 912 to pass through multiplexer 918. After this duration, the select line of multiplexer 918 switches back to selecting DFx clock 910 which is held silent at this point by clock gate control 904. The switching of the select line to multiplexer 918 is synchronous to root clock 912 so that the output of multiplexer 918 is free of glitches.

In a second example use case involving clock-stop and scan dump for silicon debug, the circuit under test is initially operating normally with root clock 912 free-running at full functional frequency. Further, the select line of multiplexer 918 selects root clock 912. At a predetermined cycle of root clock 912, the select line of multiplexer 918 is switched to select DFx clock 910, which is held silent thereby effectively stopping the clock signal output from multiplexer 918. Switching the select line of multiplexer 918 is synchronous to root clock 912 in order to avoid potential glitches at the output of multiplexer 918. Once the clock to the circuit under test is stopped, the circuit under test may transition to scan-shift mode. Subsequently, pulses of DFx clock 910 are applied to the circuit under test by clock gate circuit 904 allowing DFx clock 910 to transition and the select signal to multiplexer 918 selecting DFx clock 910. In providing DFx clock 910 to the circuit under test, contents of FFs may be shifted out of the circuit under test through a chip-level output pin.

Switching the select line of multiplexer 918 at the right time and in a synchronous manner with respect to root clock 912 may be implemented by actuating signals output from satellite controller 902 operating responsive to control signals 908. Latch 914, for example, is added in the path of signals from satellite controller 902 to multiplexer 918 as an example technique for making the transition of the select line synchronous to root clock 912 and eliminating the possibility of glitches at the output of multiplexer 918.

OR gate 916 is capable of providing an asynchronous path to over-ride the path through latch 914. This asynchronous path provided by OR gate 916 may be used for DFx functions that do not require synchronous transitions of the select line of multiplexer 918. An example of a DFx function that does not require synchronous transitions of the select line is scan clear. For such functions, the input of OR gate 916 received from satellite controller 902 is asserted to select DFx clock 910. After assertion, the circuit under test may transition to scan-shift mode with pulses being provided by DFx clock 910 to shift logic zeroes into all FFs through scan chains to implement scan clear.

Figure 10:
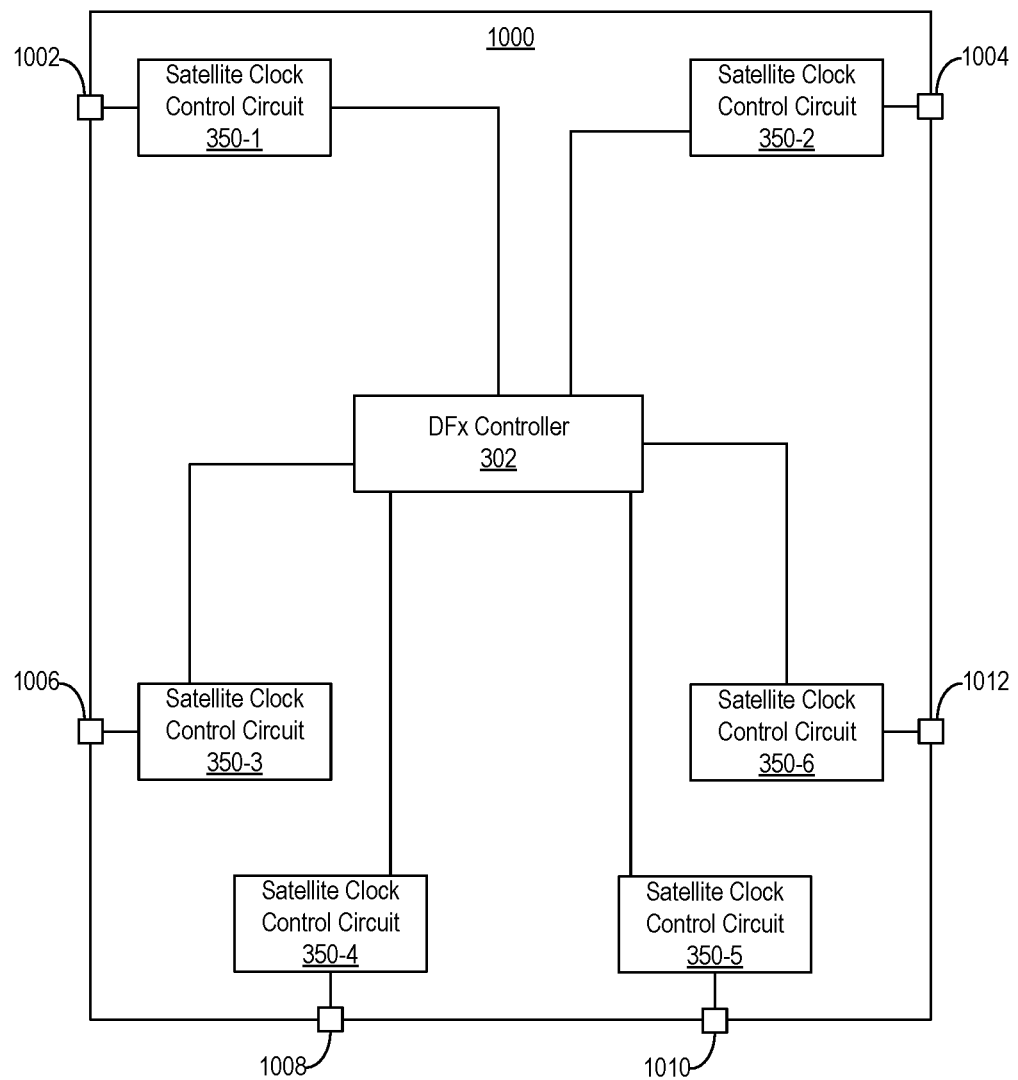
FIG. 10 illustrates an example application of physical design constraints included in a DFx IP core.

FIG. 10 illustrates an example application of physical design constraints included in a DFx IP core. In the example of FIG. 10, DFx controller 302 is located within a place and route (PNR) block 1000. DFx controller 302 is connected to each of satellite clock control circuits 350-1, 350-2, 350-3, 350-4, 350-6, and 350-6. Satellite clock control circuits 350-1, 350-2, 350-3, 350-4, 350-6, and 350-6 connect to and control clock sources 1002, 1004, 1006, 1008, 1010, and 1012, respectively. The following discussion illustrates the implementation of particular physical constraints that are included as part of DFx IP core 150 when inserted into a design.

In the example of FIG. 10, the DFx IP core 150 allows the grouping of at-speed clock elements together and placing such elements close to the at-speed clock source. In this regard, each of the satellite clock control circuits 350 is placed close to the particular clock controlled by that satellite clock control circuit. This eases the timing requirements imposed on the satellite clock control circuits.

Within satellite clock control circuits 350, the at-speed clock branches going to and from integrated clock multiplexer 906 may be excluded from balancing during clock tree synthesis (CTS) to ease timing requirements as the distribution point is from the output of multiplexer 918. In other example implementations, clock distribution may work directly from the clock source through multiplexer 918. A place and route script may be provided with the satellite clock control circuit 350 portion of the DFx IP core 150 to perform the CTS while observing the foregoing CTS constraints. The CTS script, upon execution, is capable of determining the number of instances of the satellite clock control circuit 350 for the DFx IP core and automatically place each instance of satellite clock control circuit 350 close to the clock source associated with and controlled by the satellite clock control circuit as illustrated in FIG. 10.

DFx IP core 150 and, in particular, satellite clock control circuits 350, further may include and conform to one or more static timing constraints described below. In a first mode referred to as "scan-shift mode," the select line of multiplexer 918 is set to select DFx clock 910 as output from clock gate circuit 904 to propagate out from multiplexer 918 through to circuit components in lieu of root clock 912. Root clock 912 is blocked. In scan-shift mode, the global signal scan_en is asserted and FFs transfer data from the Q output of one FF to the SI input of another FF. For this reason, the scan-shift mode only requires Q-SI paths to be timed by having set case on scan_en=1 during static timing analysis. In a second mode referred to as "mission mode," the select line of multiplexer 918 allows root clock 912 to propagate from multiplexer 918 while DFx clock 910 is blocked. In mission mode, the global signal scan_en is de-asserted such that Q outputs to SI inputs of FF-to-FF paths are ignored and only functional (or mission) mode FF-to-FF paths from the Q output of one FF to the D input of other FFs are active. For this reason, mission mode only requires Q-D paths to be timed by having set case on scan_en=0. Since there is a common convergence point in the integrated clock multiplexer 906 between DFx clock 910 (e.g., the scan clock) and root clock 912, there is no need for a separate scan capture mode. Clock gating is enabled via control signals 908 from DFx controller 302.

In one or more example implementations, an implementation script may be provided with the DFx IP core that, when executed, applies timing constraints. In addition, the script is capable of automatically finding each satellite clock control circuit instance and applying the constraints to the instance based on the mode without any input from the designer. This script is capable of operating at any level of design hierarchy whether in the block (e.g., subsystem) level or at the full chip or IC level.

Because the connections between DFx controller 302 and satellite clock control circuit are hardwired, the communication between the DFx controller 302 and satellite clock control circuits 350, though asynchronous, is deterministic. The amount of delay may be estimated so that the number of clock cycles passing before any clock is stopped by the associated satellite clock control circuit is known. A counter in DFx controller 302 that determines when to assert the control signal to stop root clock 912 (e.g., switch to DFx clock 910 and gate DFx clock 910 clock if necessary) to achieve a desired stopping time may be adjusted based on the known delay.

In another aspect, the DFx IP core 150 allows the DFx controller 302 and the satellite clock control circuits 350 to be placed in different place and route blocks despite being part of the same logical hierarchy. As an illustrative and non-limiting example, DFx controller 302 and satellite clock control circuits 350-1 and 350-2 may be in a same place and route block. Satellite clock control circuits 350-3 and 350-4 may be in another place and route block while satellite clock control circuits 350-5 and 350-6 are in yet another place and route block. Each place and route block may be placed and routed as a unit (e.g., separately and independently of the others) giving the designer further control over timing and implementation.

In one or more example implementations described herein, the signals between the DFx controller and the satellite controllers within the satellite clock control circuits may be encoded in the DFx controller and decoded in the satellite controller. By encoding in the DFx controller and decoding in the satellite controller, the number of routing channels or wires needed to convey the signals may be reduced and/or minimized. As noted, other techniques such as time-division multiplexing may be used in lieu of encoding/decoding. In addition, all wires connecting the DFx controller and the satellite controller(s) may be asynchronous thereby removing the need for clocking, pipelining, and/or applying timing constraints for these wires. The use of encoding/decoding and asynchronous communication as described provides added flexibility in that clock satellites may be moved or located virtually anywhere needed within an IC relative to the placement of the DFx controller without limitation.

In creating a new IP core and/or subsystem, the designer need only instantiate the DFx IP core therein. The designer may connect the standardized ports of the DFx IP core (e.g., the DFx controller) to obtain access to the available chip-level DFx functionality for the IP core and/or subsystem.

FIG. 11 illustrates an example method 1100 of creating a circuit architecture for expanded design for testability functionality. Method 1100 may be performed by a system such as the computer system described in connection with FIG. 12.

In block 1102, an IP core (e.g., a DFx IP core) is provided for use with a design for an IC. The IP core is capable of providing an infrastructure harness circuit configured to control expanded design for testability functions available within the IC.

In block 1104, an instance of the IP core is included in a circuit block (e.g., an IP core or subsystem) of the design for the IC. The infrastructure harness circuit can include an outward facing interface configured to connect to circuitry outside of the circuit block and an inward facing interface configured to connect to circuitry within the circuit block.

In block 1106, the instance of the IP core may be parameterized to configure the infrastructure harness circuit to control a plurality of functions selected from the expanded design for testability functions based on a user parameterization of the instance of the IP core.

The foregoing and other implementations can each optionally include one or more of the following features, alone or in combination. Some example implementations include all the following features in combination.

In one aspect, the circuit block in which the IP core is included is a hardwired circuit block. In another aspect, a plurality of instances of the IP core are included in the design and the plurality of instances are communicatively linked in a hierarchy. In another aspect, the outward facing interface communicates with control infrastructure circuitry of the integrated circuit.

In another aspect, the instance of the IP core implements, in the design, a controller including one or more circuit blocks corresponding to the plurality of functions selected from the expanded design for testability functions. The instance of the IP core further may implement one or more satellite clock control circuits. Each satellite clock control circuit is associated with a different clock source of the IC and controls a clock signal generated by the associated clock source.

In another aspect, each satellite clock control circuit is assigned to a location on the IC determined according to a location of the associated clock source.

In another aspect, the instance implements qualification circuitry configured to prevent the controller from being placed in an illegal state.

In another aspect, the controller is configured to encode signals sent to the one or more satellite clock control circuits and the one or more satellite clock control circuits are configured to decode the encoded signals. For example, the interface circuit of the DFx controller may include an encoder circuit configured to encode signals while the satellite controller may include a decoder circuit configured to decode the signals.

An apparatus may include an IC. The IC may include a plurality of testability circuits, each testability circuit corresponding to an instance of an IP core (e.g., a DFx IP core). Each instance may be independently parameterizable to perform a plurality of functions selected from expanded design for testability functions. Each testability circuit can provide a standardized interface for accessing the plurality of functions selected from the expanded design for testability functions. Each testability circuit may include a controller having one or more circuit blocks corresponding to the plurality of functions selected from the expanded design for testability functions based on a user parameterization for the instance of the IP core that corresponds to the testability circuit.

The foregoing and other implementations can each optionally include one or more of the following features, alone or in combination. Some example implementations include all the following features in combination.

In one aspect, one or more of the plurality of testability circuits are included in respective hardwired circuit blocks of the integrated circuit. In another aspect, the plurality of testability circuits are communicatively linked in a hierarchy.

In another aspect, each testability circuit may include one or more satellite clock control circuits, wherein each satellite clock control circuit is associated with a different clock source clock and controls a clock signal generated by the associated clock source, is assigned to a location on the IC determined according to a location of the associated clock source, and communicates asynchronously with the controller.

In another aspect, the controller includes an encoder circuit configured to encode signals sent to the one or more satellite clock control circuits and the one or more satellite clock control circuits include a decoder circuit configured to decode the encoded signals.

Figure 12:
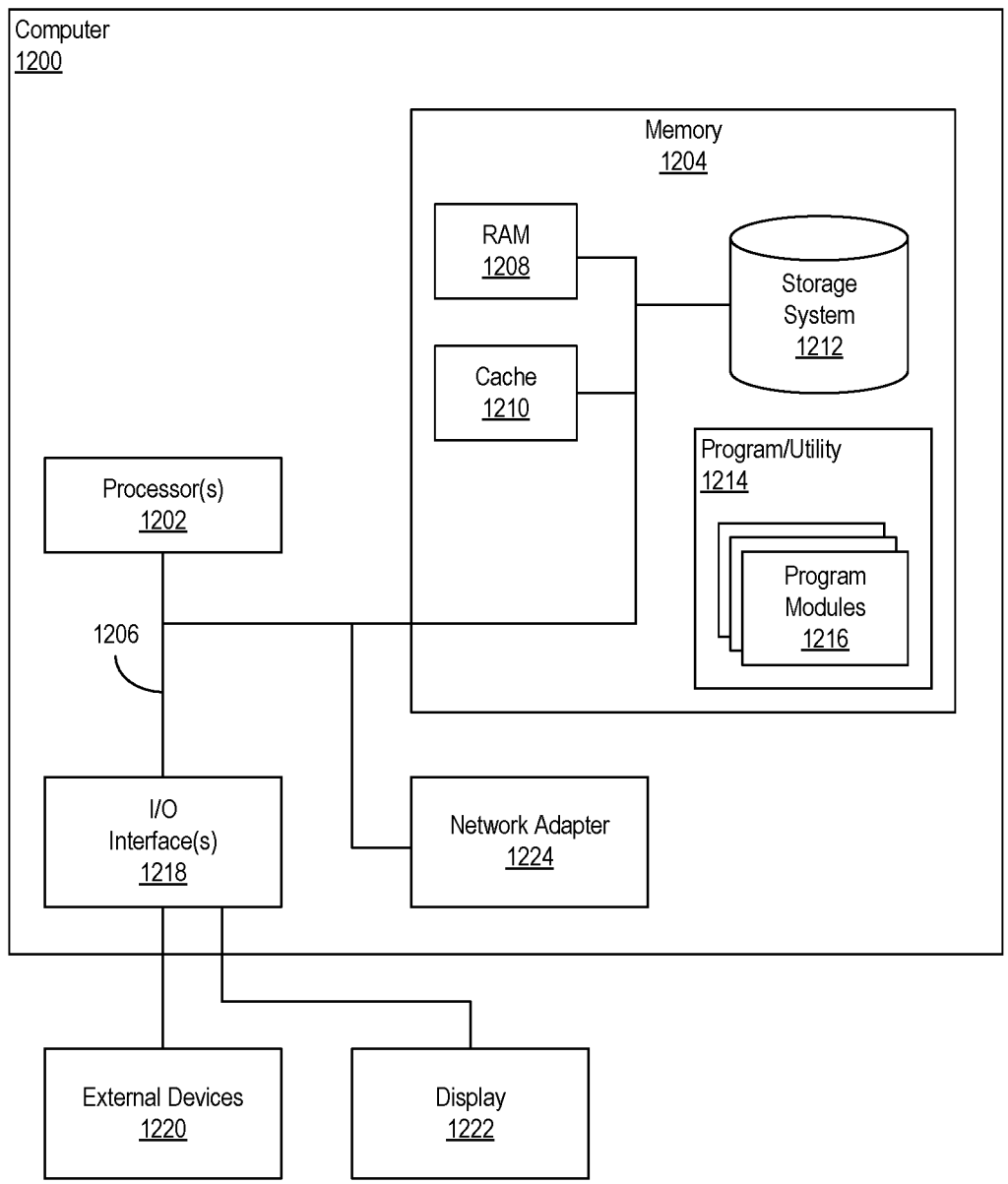
FIG. 12 illustrates an example computer system for use with the inventive arrangements described herein.

FIG. 12 illustrates an example of a computer 1200. Computer 1200 is only one example implementation of a computer. Computer 1200 may be used in a standalone capacity, e.g., as a user computing device or a server, as part of a computing cluster (e.g., two or more interconnected computers), or as a cloud computing node. The example of FIG. 12 is not intended to suggest any limitation as to the scope of use or functionality of example implementations described herein. Computer 1200 is an example of a system and/or computer hardware that is capable of performing the various operations described within this disclosure relating to distributing and providing an IP core, creating a design for an IC, instantiating an IP core, parameterizing an IP core, and the like.

Computer 1200 may be operational with numerous other general purpose or special purpose computing system environments or configurations. Examples of computing systems, environments, and/or configurations that may be suitable for use with computer 1200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 1200 can be described in the general context of computer system-executable instructions, such as program modules, that are executable by a computer system. Generally, program modules can include routines, programs, objects, components, logic, data structures, and so on that perform particular tasks or implement particular abstract data types. Computer 1200 can be practiced as a standalone computer system such as a server or in distributed cloud computing environments where tasks are performed by remote processing devices that are linked through a communications network. In a distributed cloud computing environment, program modules may be located in both local and remote computer system storage media including memory storage devices.

As shown in FIG. 12, the components of computer 1200 can include, but are not limited to, a processor 1202, a memory 1204, and a bus 1206 that couples various system components including memory 1204 to processor 1202. Processor 1202 may be implemented as one or more processors.

Bus 1206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 1200 typically includes a variety of computer system readable media. Such media may include computer-readable volatile and non-volatile media and computer readable removable and non-removable media.

Memory 1204 can include computer readable media in the form of volatile memory, such as random-access memory (RAM) 1208 and/or cache memory 1210. Computer 1200 can also include other removable/non-removable, volatile/non-volatile computer storage media. By way of example, storage system 1212 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1206 by one or more data media interfaces. Memory 1204 is an example of at least one computer program product having a set (e.g., at least one) of program modules that are configured to carry out the functions of embodiments of the invention.

Program/utility 1214, having a set (at least one) of program modules 1216, may be stored in memory 1204. By way of example, program modules 1216 may represent an operating system, one or more application programs, other program modules, and program data. Program modules 1216 generally carry out the functions and/or methodologies of the example implementations described within this disclosure. For example, one or more of the program modules can perform the various operations described within this disclosure relating to Electronic Design Automation.

Program/utility 1214 is executable by processor 1202. Program/utility 1214 and any data items used, generated, and/or operated upon by computer 1200 are functional data structures that impart functionality when employed by computer 1200. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 1200 may also communicate with one or more external devices 1220 such as a keyboard, a pointing device, a display 1222, etc.; one or more devices that enable a user to interact with computer 1200; and/or any devices (e.g., network card, modem, etc.) that enable computer 1200 to communicate with one or more other computing devices. Such communication can occur via input/output (I/O) interfaces 1218. Still, computer 1200 can communicate with one or more networks such as a local area network (LAN), a general wide area network (WAN), and/or a public network (e.g., the Internet) via a network adapter 1224. As depicted, network adapter 1224 communicates with the other components of computer 1200 via bus 1206. It should be understood that although not shown, other hardware and/or software components could be used in conjunction with computer 1200. Examples, include, but are not limited to: microcode, device drivers, redundant processing units, external disk drive arrays, RAID systems, tape drives, and data archival storage systems, etc.

Computer 1200 is an example of a data processing system. As defined herein, "data processing system" means one or more hardware systems configured to process data, each hardware system including at least one processor programmed to initiate operations and memory.

Computer 1200 may include fewer components than shown or additional components not illustrated in FIG. 12 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" and the term "designer" mean a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method, comprising:
   providing an Intellectual Property core for use with a design for an integrated circuit, wherein the Intellectual Property core provides an infrastructure harness circuit configured to control expanded design for testability functions available within the integrated circuit;
   including an instance of the Intellectual Property core in a circuit block of the design for the integrated circuit;
   wherein the infrastructure harness circuit includes an outward facing interface configured to connect to circuitry outside of the circuit block and an inward facing interface configured to connect to circuitry within the circuit block; and
   parameterizing the instance of the Intellectual Property core to configure the infrastructure harness circuit to control a plurality of functions selected from the expanded design for testability functions based on a user parameterization of the instance of the Intellectual Property core.

2. The computer-implemented method of claim 1, wherein the circuit block is a hardwired circuit block.

3. The computer-implemented method of claim 1, wherein a plurality of instances of the Intellectual Property core are included in the design and the plurality of instances are communicatively linked in a hierarchy.

4. The computer-implemented method of claim 1, wherein the outward facing interface communicates with control infrastructure circuitry of the integrated circuit.

5. The computer-implemented method of claim 1, wherein the instance of the Intellectual Property core implements, in the design:
   a controller including one or more circuit blocks corresponding to the plurality of functions selected from the expanded design for testability functions; and one or more satellite clock control circuits, wherein each satellite clock control circuit is associated with a different clock source of the integrated circuit and controls a clock signal generated by the associated clock source.

6. The computer-implemented method of claim 5, wherein each satellite clock control circuit is assigned to a location on the integrated circuit determined based on a location of the associated clock source.

7. The computer-implemented method of claim 5, wherein the controller and the one or more satellite clock control circuits communicate asynchronously.

8. The computer-implemented method of claim 5, wherein the controller is configured to encode signals sent to the one or more satellite clock control circuits and the one or more satellite clock control circuits are configured to decode the encoded signals.

9. A system, comprising:
a processor configured to initiate operations including:
providing an Intellectual Property core for use with a design for an integrated circuit, wherein the Intellectual Property core provides an infrastructure harness circuit configured to control expanded design for testability functions available within the integrated circuit;
including an instance of the Intellectual Property core in a circuit block of the design for the integrated circuit;
wherein the infrastructure harness circuit includes an outward facing interface configured to connect to circuitry outside of the circuit block and an inward facing interface configured to connect to circuitry within the circuit block; and
parameterizing the instance of the Intellectual Property core to configure the infrastructure harness circuit to control a plurality of functions selected from the expanded design for testability functions based on a user parameterization of the instance of the Intellectual Property core.

10. The system of claim 9, wherein the circuit block is a hardwired circuit block.

11. The system of claim 9, wherein a plurality of instances of the Intellectual Property core are included in the design and the plurality of instances are communicatively linked in a hierarchy.

12. The system of claim 9, wherein the outward facing interface communicates with control infrastructure circuitry of the integrated circuit.

13. The system of claim 9, wherein the instance of the Intellectual Property core implements, in the design:
a controller including one or more circuit blocks corresponding to the plurality of functions selected from the expanded design for testability functions; and
one or more satellite clock control circuits, wherein each satellite clock control circuit is associated with a different clock source of the integrated circuit and controls a clock signal generated by the associated clock source.

14. The system of claim 13, wherein each satellite clock control circuit is assigned to a location on the integrated circuit determined based on a location of the associated clock source.

15. The system of claim 13, wherein the controller and the one or more satellite clock control circuits communicate asynchronously.

16. The system of claim 13, wherein the controller is configured to encode signals sent to the one or more satellite clock control circuits and the one or more satellite clock control circuits are configured to decode the encoded signals.

17. An apparatus, comprising:
an integrated circuit, wherein the integrated circuit includes:
a plurality of testability circuits, each testability circuit corresponding to an instance of an Intellectual Property core, wherein each instance is independently parameterizable to perform a plurality of functions selected from expanded design for testability functions;
wherein each testability circuit provides a standardized interface for accessing the plurality of functions selected from the expanded design for testability functions; and
wherein each testability circuit includes a controller including one or more circuit blocks corresponding to the plurality of functions selected from the expanded design for testability functions based on a user parameterization for the instance of the Intellectual Property core that corresponds to the testability circuit.

18. The apparatus of claim 17, wherein the plurality of testability circuits are communicatively linked in a hierarchy.

19. The apparatus of claim 17, wherein each testability circuit comprises:
one or more satellite clock control circuits, wherein each satellite clock control circuit:
is associated with a different clock source clock and controls a clock signal generated by the associated clock source;
is assigned to a location on the integrated circuit determined based on a location of the associated clock source; and
communicates asynchronously with the controller.

20. The apparatus of claim 19, wherein the controller is configured to encode signals sent to the one or more satellite clock control circuits and the one or more satellite clock control circuits are configured to decode the encoded signals.

* * * * *